(12) United States Patent
Chang et al.

(10) Patent No.: US 6,293,529 B1
(45) Date of Patent: Sep. 25, 2001

(54) BUBBLE GENERATING APPARATUS

(76) Inventors: Tsun Shin Chang, No. 128-3, Ta Jung E. St., Hsi Tun Dist, Taichung; Shih Ching Chuang, 6FL., No. 23, Lane 308, Kuang Fu S. Rd., Taipei, both of (TW)

( * ) Notice: Subject to any disclaimer, the term of this patent is extended or adjusted under 35 U.S.C. 154(b) by 0 days.

(21) Appl. No.: 09/584,532

(22) Filed: Jun. 1, 2000

(51) Int. Cl.$^7$ .................................................... B01F 3/04
(52) U.S. Cl. ........................ 261/123; 261/124; 210/221.1
(58) Field of Search ................................. 261/121.1, 123, 261/124; 210/221.1, 221.2, 703

(56) References Cited

U.S. PATENT DOCUMENTS

| | | | |
|---|---|---|---|
| 45,206 | * 11/1864 | McAvoy | ................................. 261/123 |
| 3,446,488 | * 5/1969 | Mail et al. | . |
| 3,542,675 | * 11/1970 | Mail et al. | . |
| 4,338,192 | * 7/1982 | Krasnoff et al. | ................... 210/221.2 |
| 5,783,118 | * 7/1998 | Kolaini | .................................. 261/123 |
| 6,017,449 | * 1/2000 | Eriksson et al. | ...................... 261/124 |

* cited by examiner

Primary Examiner—C. Scott Bushey
(74) Attorney, Agent, or Firm—Bacon & Thomas, PLLC

(57) ABSTRACT

A bubble generating apparatus includes a hollow shell having a plurality of bottom inlets through and a side outlet, a screw rod longitudinally mounted in the shell, a baffle threaded onto one end of the screw rod and suspended inside the shell above the bottom inlets, the baffle having a plurality of smoothly arched bottom notches for baffling intake flows of high pressure liquid to produce bubbles, and a knob fastened to one end of the screw rod outside the shell and rotated to move the baffle along the screw rod relative to the bottom inlets.

2 Claims, 3 Drawing Sheets

BUBBLE GENERATING APPARATUS

BACKGROUND OF THE INVENTION

The present invention relates to a bubble generating apparatus, and more particularly to such a bubble generating apparatus, which is practical to produce tiny bubbles.

A variety of bubble generators have been disclosed for use in water treatment devices. These bubble generators commonly comprise a water container having a waste water inlet and a waste water outlet, and a high-pressure air source controlled to supply high-pressure air into the water container, causing bubbles to be produced in waste water. The water treating performance of a water treatment device has a great concern with the size of the bubbles produced in the bubble generator. However, because conventional bubble generators cannot produce tiny bubbles to effectively float dirt to the surface of the liquid in the respective water treatment device.

SUMMARY OF THE INVENTION

The present invention has been accomplished under the circumstance in view. It is one object of the present invention to provide a bubble generating apparatus, which is practical to produce tiny bubbles. It is another object of the present invention to provide a bubble generating apparatus, which is suitable for use in fish farming to generate tiny bubbles in water. According to the present invention, the bubble generating apparatus comprises a hollow shell having a plurality of bottom inlets through and a side outlet, a screw rod longitudinally mounted in the shell, a baffle threaded onto one end of the screw rod and suspended inside the shell above the bottom inlets, the baffle having a plurality of smoothly arched bottom notches for baffling intake flows of high pressure liquid to produce bubbles, and a knob fastened to one end of the screw rod outside the shell and rotated to move the baffle along the screw rod relative to the bottom inlets.

DETAILED DESCRIPTION OF THE PREFERRED EMBODIMENT

Figure 1:
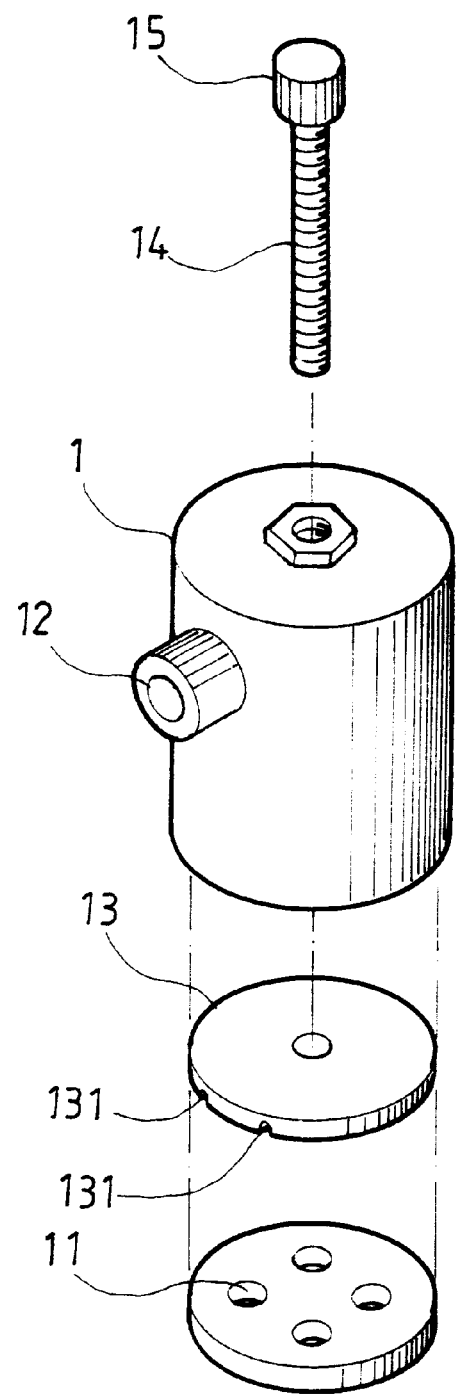
FIG. 1 is an exploded view of a bubble generating apparatus according to the present invention.
Figure 2:
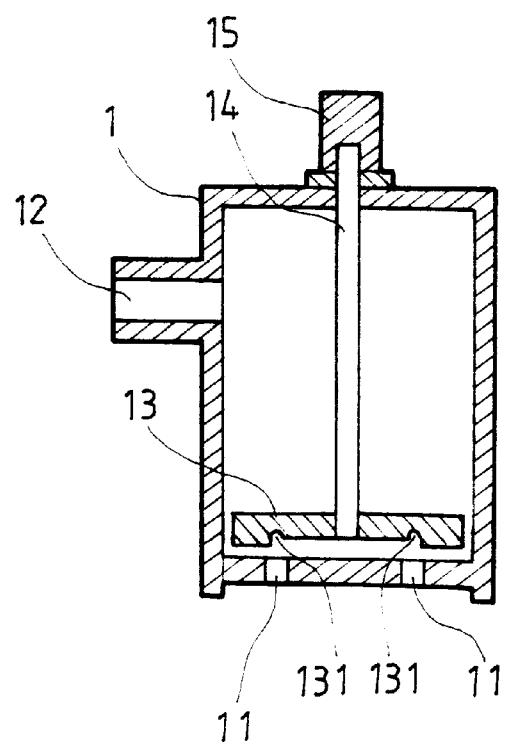
FIG. 2 is a sectional assembly view of the bubble generating apparatus shown in FIG. 1.
Figure 3:
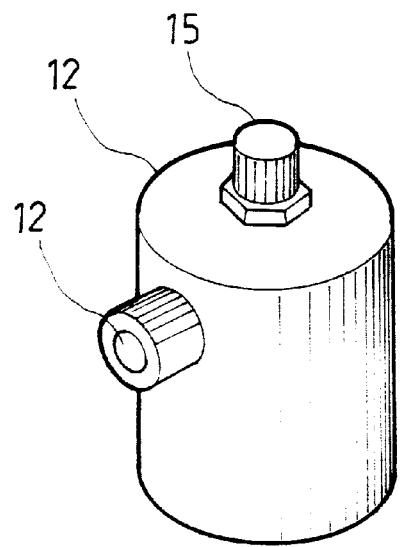
FIG. 3 is an elevational view of FIG. 2.

Referring to FIGS. from 1 through 3, a bubble generating apparatus in accordance with the present invention comprises a hollow shell 1, a baffle 13, a screw rod 14, and a knob 15. The hollow shell 1 comprises a plurality of bottom inlets 11, and a side outlet 12. The screw rod 14 is longitudinally mounted in the shell 1. The baffle 13 is threaded onto one end, namely, the bottom end of the screw rod 14 and suspended inside the shell above the bottom inlets 11, having a plurality of smoothly arched bottom notches 131. The knob 15 is fastened the other end, namely, the top end of the screw rod 14 and disposed outside the shell 1. Rotating the knob 15 causes the baffle 13 to be moved along the screw rod 14 to adjust the pitch between the baffle 13 and the bottom inlets 11.

Figure 4:
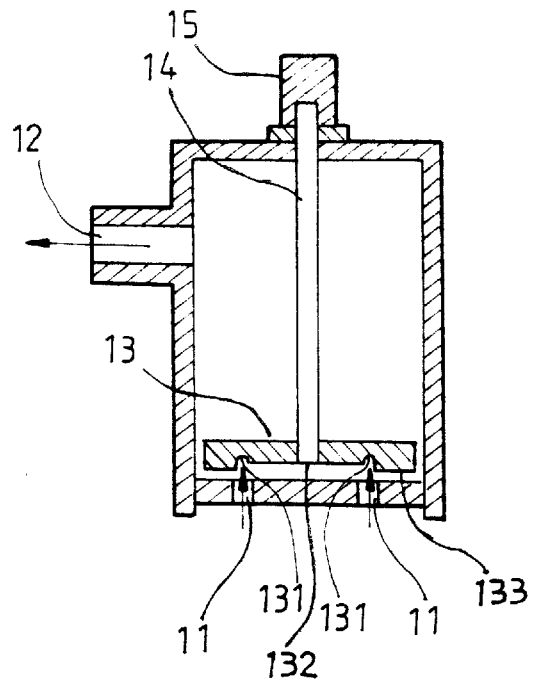
FIG. 4 is a sectional view of the present invention, showing the flowing direction of a high pressure liquid through the shell.
Figure 5:
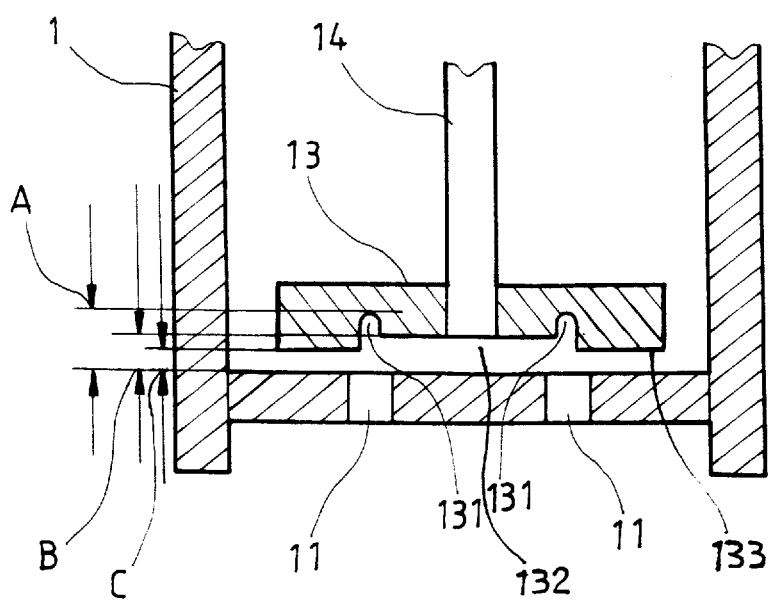
FIG. 5 is an enlarged view of the lower part of bubble generating apparatus.

Referring to FIGS. 4 and 5, the bottom side wall of the baffle 13 has a protruding peripheral portion 133 defining a recessed center area 132. The bottom notches 131 are disposed in between the protruding peripheral portion 133 and the recessed center area 132. Thus, a flow passage A, a first liquid crushing space B and a second liquid crushing space C are defined inside the shell 1. The flow passage A is defined between the bottom notches 131 of the baffle 13 and the bottom inlets 11. The first liquid crushing space B is defined between the recessed center area 132 of the baffle 13 and the bottom inlets 11. The second liquid crushing space C is defined between the protruding peripheral portion 133 and the bottom inlets 11. When a high pressure liquid is delivered from a high pressure liquid container (not shown) into the shell 1 through the bottom inlets 11, the intake flows of high pressure liquid rush through the flow passage A into the first liquid crushing space B and then the second liquid crushing space C, and then flow out of the shell 11 through the side outlet 12. When passing through the first liquid crushing space B and then the second liquid crushing space C, the intake flows of high pressure liquid are mixed and but by the uneven bottom side wall of the baffle 13, causing tiny bubbles to be produced and carried with the high pressure liquid out of the shell 1 through the side outlet 12.

While only one embodiment of the present invention has been shown and described, it will be understood that various modifications and changes could be made thereunto without departing from the spirit and scope of the invention disclosed.

What the invention claimed is:

1. A bubble generating apparatus comprising:
    a hollow shell, said shell comprising a plurality of bottom inlets through which a high pressure liquid is guided into said shell, and a side outlet through which the intake high pressure liquid passes out of said shell;
    a screw rod longitudinally mounted in said shell, said screw rod having a bottom end suspended inside said shell and a top end disposed outside said shell;
    a baffle threaded onto the bottom end of said screw rod and suspended inside said shell above said bottom inlets, said baffle having a bottom side wall and a plurality of smoothly arched bottom notches in said bottom side wall for baffling the high pressure liquid guided through said bottom inlets into said shell to produce bubbles; and
    a knob fastened to the top end of said screw rod and rotated to move said baffle along said screw rod relative to said bottom inlets.

2. The bubble generating apparatus of claim 1 wherein the bottom side wall of said baffle has a recessed center area and a protruding peripheral portion surrounding said recessed center area, and defines a flow passage between said bottom notches and said bottom inlets, a first liquid crushing space between said recessed center area and said bottom inlets, and a second liquid crushing space between said protruding peripheral portion and said bottom inlets.

* * * * *